J. T. CASTRO.
LOG MEASURE.
APPLICATION FILED MAR. 22, 1910.
991,478.
Patented May 9, 1911.
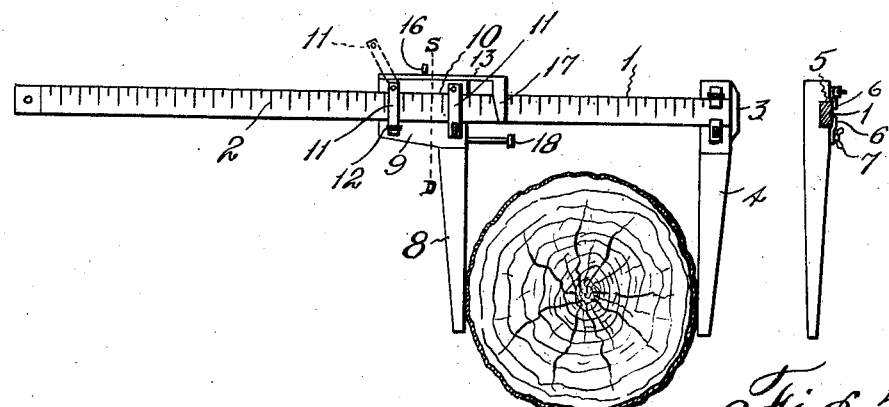
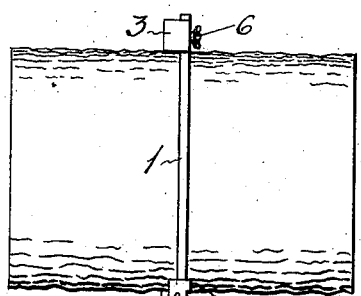
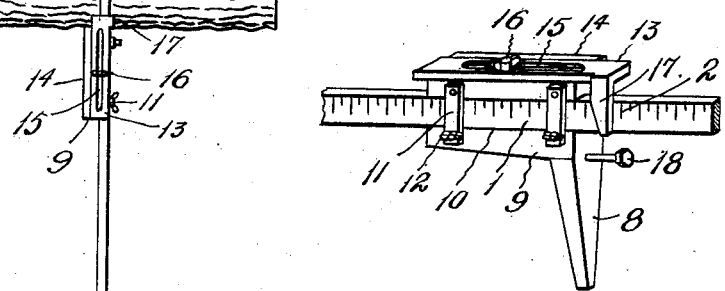
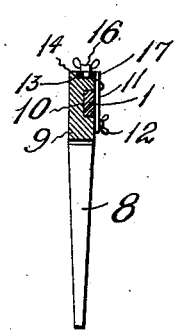
WITNESSES:
J. L. Bowling
L. E. Noack
INVENTOR
J. T. Castro,
BY
ATTORNEYS

UNITED STATES PATENT OFFICE.

JAMES T. CASTRO, OF LANANA, TEXAS.

LOG-MEASURE.

991,478. Specification of Letters Patent. Patented May 9, 1911.

Application filed March 22, 1910. Serial No. 550,994.

*To all whom it may concern:*

Be it known that I, JAMES T. CASTRO, citizen of the United States, residing at Lanana, in the county of Nacogdoches and State of Texas, have invented certain new and useful Improvements in Log-Measures, of which the following is a specification.

This invention relates to measuring instruments and more particularly to log measure attachments.

The object of the invention is to provide an attachment which may be placed on an ordinary log scaling stick without alterations to the stick or the use of tools or skilled labor.

Another feature resides in a compensating slide whereby allowance may be made for the thickness of the bark of the log and a portion of the stick occupied by one member of the attachment, together with a guard stop to prevent dislodging of the slide when the members of the attachment are in close relation.

Finally the object of the invention is to provide means of the character described that will be strong, durable, efficient, and easy of operation, simple and comparatively inexpensive to construct, and also in which the several parts will not be likely to get out of working order.

With the above and other objects in view, the invention has relation to certain novel features of construction and operation, an example of which is described in this specification and illustrated in the accompanying drawings, wherein:

Figure 1. is a side elevation of an ordinary log measuring stick in position on a log and with the invention in position thereon, Fig. 2. is a plan view of the same, Fig. 3. is a transverse section on the line S—D of Fig. 1, Fig. 4. is a detail of one of the members in perspective, and Fig. 5 is a detail in elevation of the other member.

In the drawings the numeral 1, designates an ordinary log or scaling stick having the usual graduations 2 and end plate 3. A measure of this character is commonly employed in measuring the diameter of logs prior to the sawing of the same. The stick is laid transversely of the log with the end plate 3 in line with one side. The diameter is determined by "sighting" from a point above the stick and approximating the particular graduation under which the side of the log opposite to the end plate 3, extends. This method is largely a matter of guesswork.

The prime object of my invention is to provide an attachment comprising two members which may be attached to the usual stick in a very short time and by the use of which the exact measurement with the thickness of the bark omitted, may be had. One member comprises an extended arm 4 which has a recess 5 in one side to receive the stick 1. The arm abuts the inner side of the plate 3 and is held in position on the stick by cleats 6. These cleats are fastened on each side of the recess by thumb screws 7 and project over the stick in opposed relation. By loosening the thumb screws the cleats may be swung to one side and permit the stick to be inserted in or removed from the recess. When the cleats are swung over the stick they are caused to impinge the stick by tightening the thumb screws and thereby fastening the arm 4 in position. The other member is adapted to slide on the stick and has an arm 8 extending in parallel relation to the arm 4. This arm 8 extends from a shoe 9 having in one side a recess 10 for receiving the stick and whereby the shoe may be moved longitudinally on the stick. The shoe is retained on the stick by straps 11 pivoted at one end and spanning the recess. These straps are fastened, each at its free end by a thumb screw 12 screwed into the side of the shoe. By removing the thumb screws 12, the straps may be swung to one side and permit the stick to be placed in or removed from the recess 10. In order to carry out this operation it is necessary to either remove or raise and turn the compensating slide 13 as hereinafter described, to one side. It is obvious that these members may be expeditiously attached to an ordinary log measuring stick without the use of tools.

On the side of the shoe opposite to which the arm 8 is fixed, an elongated slide 13 is disposed to be moved longitudinally of the stick 1. This slide has one longitudinal edge substantially flush with that side of the shoe in which the recess 10 is formed, while the other longitudinal edge of the slide bears against a longitudinal lip 14 extending up from the shoe. The slide is also provided with an elongated longitudinal slot 15 through which a thumb screw 16 passes and engages in the shoe. The slot permits a longitudinal adjustment of the slide, the lip guides and retains the slide in in position, and the thumb screw 16 fastens the slide in the position to which it is adjusted.

At the forward end of the slide a downturned index finger 17 is provided. This finger extends over the graduated side of the stick and in close proximity thereto as is shown in Fig. 4. I have called the part 13, a compensating slide for the reason that some compensation must be made for that part of the stick occupied by the arm 4 and also for the thickness of the bark, in order to obtain a correct and accurate measurement of the diameter of the log. It is apparent that by moving the slide toward the arm 4 and beyond the arm 8 to the proper distance the compensation will be properly made when the instrument is placed over a log and the arms brought in contact with the sides of the latter, the indicator finger 17 alining with a graduation on the stick giving the desired measurement.

To prevent the slide 13 from contacting with the arm 4 and being displaced from its adjusted position, when the arms are not separated by a log, a stop 18 is provided on the shoe 9 and directed toward the arm 4. This stop has sufficient length to at all times project beyond the end of the slide. In removing the shoe 9 from the stick or placing it thereon, the slide can either be entirely removed from the shoe or the thumb screw 16 turned sufficiently to permit the slide to be raised and turned transversely of the shoe.

I wish to impress the fact that my invention is an attachment which may be applied to the ordinary log measuring stick and if one possesses the stick it is only necessary to acquire the members of the attachment and place them on the stick.

It is to be understood that the shoe 9 is a part of the arm 8 as it forms the base of the arm although it need not necessarily be made integral with the arm. While I have called the part 17 an index finger this part is commonly known in the art as an index or an index point.

What I claim is:

An attachment for a log measuring stick, comprising, a pair of arms, each arm having a recess for the reception of a log measuring stick, one of said arms having a shoe in which its recess is formed, pivoted cleats adjacent the recesses for engagement with a log measuring stick, a longitudinal lip provided on the shoe of the said arm, and a compensating slide parallel with and engaging the lip and having a slot longitudinally thereof, an index finger extending at right angles to the slide and adapted to aline with the graduations on the side of a log measuring stick, and a fastening extending through the slot of the slide and engaging the shoe of the arm.

In testimony whereof I have signed my name to this specification in the presence of two subscribing witnesses.

JAMES T. CASTRO.

Witnesses:
W. M. THOMAS,
G. A. PHILLIPS.

---

Copies of this patent may be obtained for five cents each, by addressing the "Commissioner of Patents, Washington, D. C."